Figure 1:
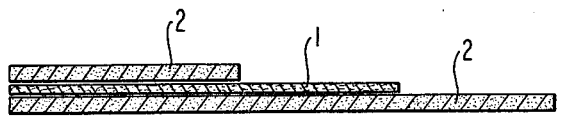

United States Patent [19]

Thun

[11] 4,219,603
[45] Aug. 26, 1980

[54] BITUMINOUS ROOFING AND SEALING WEB WITH FIBER CONTAINING INSERT

[75] Inventor: Dieter Thun, Elmshorn, Fed. Rep. of Germany

[73] Assignee: Ruberoidwerke Aktiengesellschaft, Hamburg, Fed. Rep. of Germany

[21] Appl. No.: 927,262

[22] Filed: Jul. 24, 1978

[30] Foreign Application Priority Data

Jul. 28, 1977 [DE] Fed. Rep. of Germany ....... 2734004

[51] Int. Cl.² ............................................. B32B 7/00
[52] U.S. Cl. .................................... 428/246; 428/262; 428/265; 428/489

[58] Field of Search ............... 428/246, 251, 252, 262, 428/284, 291, 489, 265

[56] References Cited

U.S. PATENT DOCUMENTS

| 3,457,136 | 7/1969 | Zaadnoordijk | 428/489 |
| 4,035,544 | 7/1977 | Iwasaki | 428/291 |
| 4,039,706 | 8/1977 | Tajima et al. | 418/489 |

*Primary Examiner*—James J. Bell
*Attorney, Agent, or Firm*—Beveridge, DeGrandi, Kline & Lunsford

[57] ABSTRACT

A bituminous roofing and sealing web is disclosed containing a fibrous insert.

2 Claims, 3 Drawing Figures

BITUMINOUS ROOFING AND SEALING WEB WITH FIBER CONTAINING INSERT

The present invention relates to a bituminous roofing and sealing web with fiber-containing carrier insert.

Roofing and sealing webs with various types of bituminous cover layers and inserts of glass fleece or plastics, predominantly polyester fleeces or corresponding fabrics, are known in the art. Since the glass fiber fleeces are not sufficiently stable against mechanical stresses during or after placement, attempts were made to bring about the desired pliability and strength of such inserts and of the webs equipped therewith, by providing the sealing webs with an additional insert of synthetic fibers. See, for example, German OS No. 16 19 312.

The use of different types of fleece with variable characteristics has also been suggested for use in bituminous sealing webs according to German OS No. 24 10 317. The reinforcement of a glass fleece was to be brought about at the same time by the cover of a plastic fabric. According to the German Gbm No. 1 934 702, strengthening of the glass fleece of a working material web is suggested to be accomplished either by a cover or a support, or by insertion or inlay of a synthetic fiber fabric. In any case, the prior art has suggested that the various carrier inserts, namely the fleece and the strengthening fabric, are to be deposited separately during the manufacture of the web of working material.

Roofing and sealing webs with inserts or inlays, such as those described previously, still do not fulfill the requirement of high mechanical strength with simultaneous flexibility to a sufficient degree. Experiments have shown that in case of an insert of fleeces with variable characteristics, superposed in layers, actually large differences in behavior between the thin glass fleece and the synthetic fiber layers are to be noted. That is to say, whenever a strip of such an insert is clamped into the tearing machine, one will find that the layer of glass fleece will tear sooner than the plastic fleece layer.

Therefore, the present invention is based on the task of creating a bituminous roofing and sealing web with a fiber-containing carrier insert, which does not have the described disadvantages of the prior art and which corresponds in its mechanical characteristics at least to the webs equipped with organic fiber fleeces and which possesses additional improvements.

It is accordingly a feature of the present invention to provide a bituminous roofing and sealing web containing a fiber-containing carrier insert or inlay which is a layer of fleece or fabric and which corresponds in its mechanical strength characteristics at least to the webs equipped with organic fiber fleeces and moreover, possesses additional improvements.

It is a further feature of the invention to provide a bituminous roofing and sealing web, wherein the carrier insert comprises a mixture of glass or mineral fibers and organic synthetic fibers. According to the invention, the bituminous web contains the two types of fibers of variable quality in the form of a single insert layer, preferably in the manner of a mixed fleece, in case of which the fibers are formed of glass or mineral and synthetic plastic, for example, polyester or polyamide fibers criss-cross with each other inseparably from the beginning during the production process. Such a mixed fleece is bonded together very effectively by now-combustible adhesives.

According to another embodiment according to the invention, the roofing and sealing web contains an adhesive-less insert of mixed fabric, and in that case, every thread of the fabric within itself represents a mix of small glass and synthetic plastic fiber threads, preferably small polyester threads.

Figure 2:
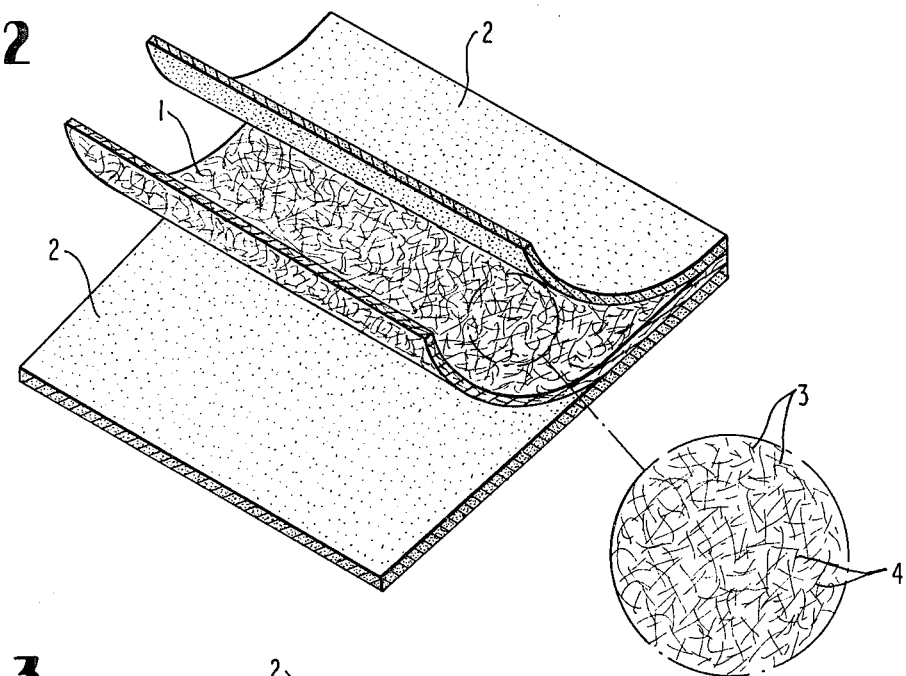
Figure 3:
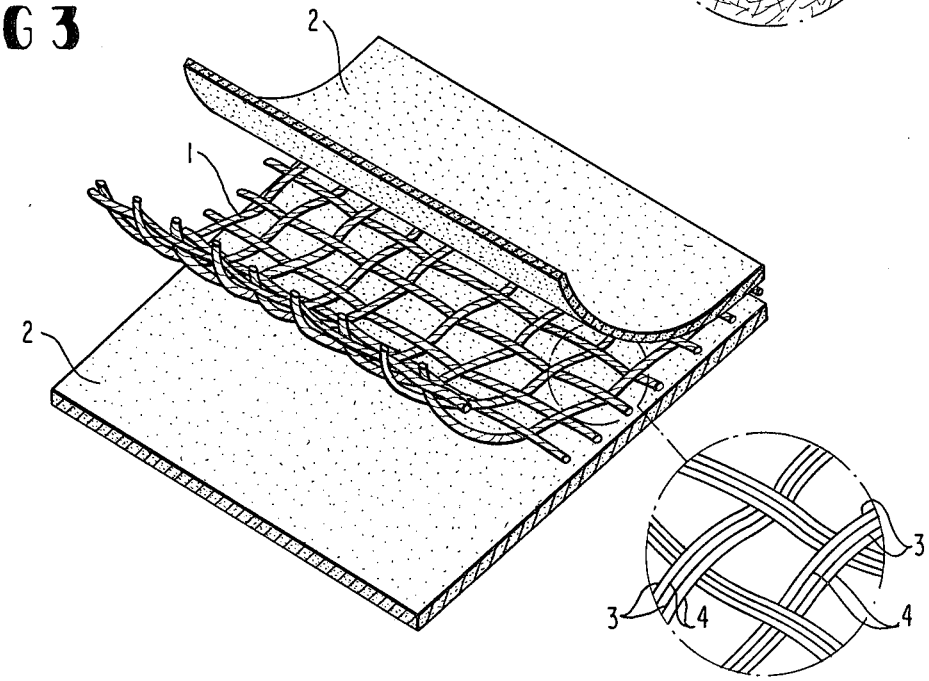

The drawings further illustrate the structure of the roofing and sealing web of the invention, wherein FIG. 1 shows an insert identified by 1 and the bituminous layer by 2, and FIGS. 2 and 3 show the sealing web of the invention with folded up layers.

More particularly, FIG. 2 shows a mixed fleece with the various types of fibers 3, such as glass, and synthetics 4, such as polyester. FIG. 3 shows a mixed fabric with the various fabric threads 3, such as glass, and synthetics 4, such as polyester.

Bituminous sealing webs of the present invention combine the advantages of both fleeces or also of fabrics and in case of mechanical stress, no tears by layers will occur. The elasticity modulus is better than in the case of a glass fleece or polyester cover web. Also the dimensional stability is improved, so that the disadvantage of possible shrinkage, which may normally occur in case of synthetic plastic inserts, will be eliminated. Moreover, the webs according to the invention are more reasonable in price, and possess the very best characteristics thereby making them very attractive from the commercial standpoint.

It will be understood that any suitable bituminous material may be used for purposes of this invention. Further, persons skilled in the art will recognize that any suitable glass fiber or commercial fiber may be used as well as any suitable synthetic resinous fiber or blend of fibers may be used.

Further modifications and variations of the invention will be apparent to those skilled in the art.

I claim:

1. A bituminous roofing and sealing web with a fiber containing insert, wherein said insert comprises a woven layer of fabric which is produced from a mixture of glass or mineral fibers and organic synthetic fibers wherein each individual thread of the fabric is a multifilament thread and is formed of a mixture of glass or mineral fibers and organic synthetic fibers.

2. The bituminous roofing and sealing web set forth in claim 1 wherein each thread is a mixture of glass and polyester threads.

* * * * *